United States Patent

[11] 3,596,892

| [72] | Inventors | Minoru Nakanishi;<br>Hidehiko Hayasaki, both of Tokyo, Japan |
|---|---|---|
| [21] | Appl. No. | 883,493 |
| [22] | Filed | Dec. 9, 1969 |
| [45] | Patented | Aug. 3, 1971 |
| [73] | Assignee | Kabushiki Kaisha Tanaka Seisakusho<br>Tokyo, Japan |
| [32] | Priority | Dec. 13, 1968 |
| [33] | | Japan |
| [31] | | 43/90,919 |

[54] AUTOMATIC GAS CUTTING DEVICE
6 Claims, 7 Drawing Figs.

[52] U.S. Cl. .................................................. 266/23 M,
    266/23 R, 266/23 K
[51] Int. Cl. ...................................................... B23k 7/10
[50] Field of Search ............................................ 266/23 R,
    23 H, 23 HH, 23 K, 23 L, 23 M, 23 P, 23 Q, 23 T

[56] References Cited
UNITED STATES PATENTS
2,949,391  8/1960  Anderson .....................  266/23 M

*Primary Examiner*—Gerald A. Dost
*Attorney*—Sughrue, Rothwell, Mion, Zinn and Macpeak ABSTRACT: An automatic gas cutting device including means for detecting electromotive force produced across a preheating flame of the gas cutting device and means to control the running or the stopping of the device and to control the starting and stopping of the gas cutting automatically under an instruction of the detecting means. The detecting means based on a principle using a difference of the induced voltage across the flame of the gas cutting for each of the cutting conditions.

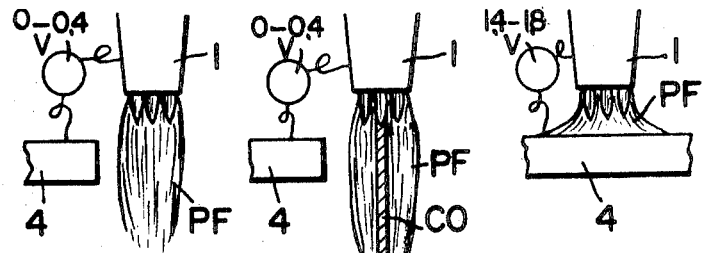
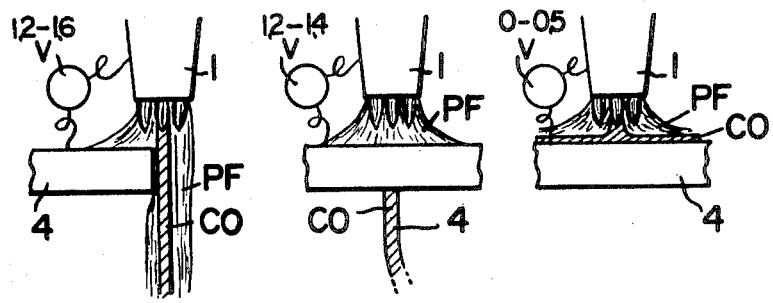
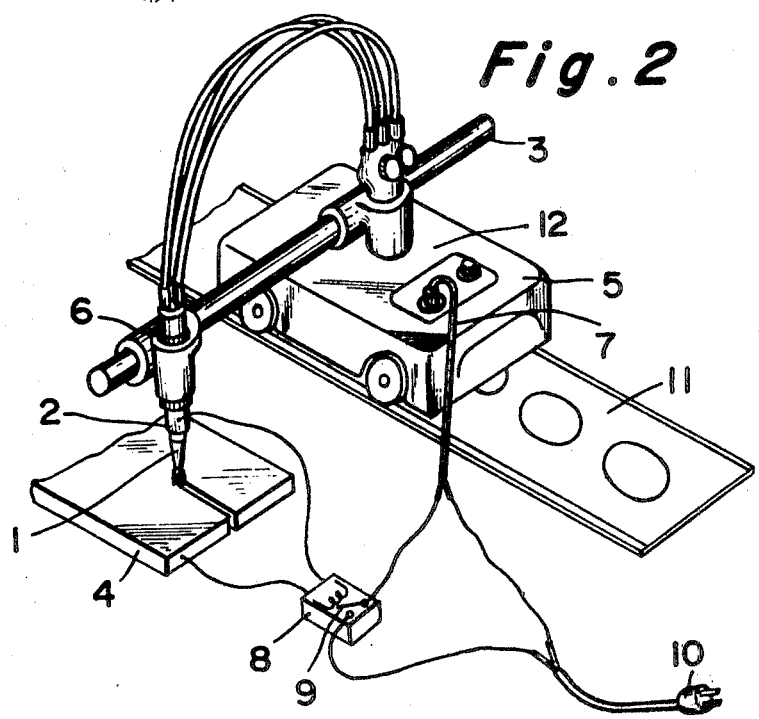
INVENTOR
BY
ATTORNEY

AUTOMATIC GAS CUTTING DEVICE

BACKGROUND OF THE INVENTION

An automatic gas cutting device is known, in which the cutting torch nozzle of the cutting device is moved by a carrying train running on a rail and the gas cutting is progressed automatically along a predetermined line.

In such a known device, there is a disadvantage in that if the action of cutting oxygen is discontinued instantaneously by some reason, for instance, by a presence of rust or paint on the surface of the cutting piece and if the movement of the device is continued, the cutting oxygen acts to cool the workpiece and the cutting is no longer effected, while the device is moved by the automatic movement of the carrying device, therefore the whole cutting work of the stroke remains as incompleted. There is also a desire to control the cutting flame to be stopped automatically at the end of a cutting stroke in order to save the fuel or oxygen and to protect the device. Since there have been no means to detect the endurance of an effective cutting flame, it is necessary to watch the progress of the automatic cutting and thus the automatic operation was not perfect.

The present invention is to mitigate the above disadvantages and intends to realize an automatic gas cutting device having means to detect the above fault condition or the finishing condition and to control to stop the running of the device or to control to stop the gas cutting.

SUMMARY OF THE INVENTION

The present invention has for its object to realize an automatic gas cutting device, in which automatic running or stopping of the device, an automatic starting of the gas cutting and an emergency stop of the gas cutting may be effected under full automatical control by detecting voltage variation of the produced voltage across the cutting flame caused by a change of status of the gas cutting.

The present invention is obtained by an idea of detecting voltage variation across the flame caused by an electromotive force in the flame produced by a principle of so-called Klein effect.

It is known that an electromotive force is induced across a fired flame. The inventors had realized that there are two kinds of the induced voltages according to the cutting conditions of the gas cutting.

In an ordinary conditions of the stage of gas cutting, this potential rises in a range about 1.2 to 1.8v. Such conditions are the preheating condition, the beginning condition and the cutting condition. On the other hand, in the conditions such as before the preheating stage or test ejection stage or a cutting fire distinguished stage, which is called as emergency, such potential rises in a range between 0 to 0.5 v.

The present invention utilizes the difference between the two voltage ranges mentioned as above, since there are a remarkable difference from each other between the two ranges.

The present invention has its feature to comprise a detecting means to detect the potential difference between the two ranges of the produced voltage and to control the running or stopping of the device and to control the supply or fuel or cutting oxygen gas to the cutting nozzle so as to effect an automatic starting, automatic stopping or automatic restoration of the gas cutting.

BRIEF DESCRIPTION OF THE DRAWINGS

FIGS. 1a to 1f show various stages of gas cutting, especially showing the positional relation between the cutting nozzle and the work piece and also the condition of preheating flame and the cutting oxygen, and also to show just schematically an induced voltage across the flame of the gas cutting, wherein;

FIG. 1a shows a status prior to the preheating of the work piece,

FIG. 1b shows a status of test ejection of the cutting oxygen,

FIG. 1c shows situation of preheating,

FIG. 1d shows a beginning situation of the gas cutting for an edge thereof,

FIG. 1e shows a progressive situation of a normal gas cutting,

FIG. 1f shows an accidental condition in which the cutting action of the cutting oxygen had been discontinued and the oxygen is act to cool the surface of the work piece, and, FIG. 2 shows a partial diagrammatical perspective view of a device according to the present invention.

DESCRIPTION OF THE REFERRED EMBODIMENT

Before explaining the detailed mechanism of the present invention, the behavior of the voltage difference produced by Klein effect will briefly be explained.

FIG. 1a shows a situation prior to the preheating of the work piece, for instance, a steel plate. In this figure, 1 is the torch nozzle of the cutting device and 4 shows the work piece, for instance, a steel plate. In this stage of operation a preheating flame PF is ejected from the nozzle and fired according to known practice. While ejecting the fired preheating flame PF, if a potentiometer is connected between the nozzle 1 and the work piece 4 a voltage in a range of 0 to 0.4 v. may be induced. This phenomena is known as the Klein effect.

FIG. 1b shows a situation when a cutting oxygen CO is ejected from a center hole of the nozzle 1, while ejecting the fired preheating flame PF. This ejection of cutting oxygen CO is just for a testing of the condition of the device. In this stage, the induced voltage remains in the same range and is 0 to 0.4 v. as illustrated in the drawing.

FIG. 1c shows a preheating situation wherein the surface of the workpiece 4 is heated by the preheating flame PF and the cutting oxygen CO is not ejected yet. In this situation the voltage difference between the two elements 1 and 4 increases in a range about 1.4 to 1.8 v.

FIG. 1d shows a situation just beginning of the normal cutting operation, wherein the preheating flame PF is fired and the end of working piece 4 is heated at a high temperature and the cutting oxygen CO is just made contact with the edge of the workpiece 4. In this stage the induced potential difference rises in a range of 1.2 to 1.6 v.

FIG. 1e shows a normal cutting condition during the progress of the automatic cutting. In this situation the cutting oxygen CO penetrates the workpiece 4 and proceeds the cutting by the heat produced by the oxidization. The induced voltage of the potential produced by the Klein effect shows a slight decreases and lies in a range of 1.2 to 1.4 v. as shown in the figure.

FIG. 1f shows an emergency condition wherein the production of the heat produced by the oxidizing effect of the cutting oxygen CO is discontinued instantaneously by some reason, which may be a presence of scale or rust on the surface or a presence of small amount of paint on the surface. In this situation even the preheating flame PF is ejected and fired, but the heat of the preheating flame is not conveyed to the workpiece due to the presence of high speed cutting oxygen which is not fired so that the cutting is permanently discontinued while the device keeps the running.

In a known device in order to prevent such loss caused by an occurrence of the emergency situation as indicated in FIG. 1f, the automatic cutting needs some of manual supervision or some complicated device to prevent the occurrence of such emergency conditions.

In accordance with the present invention a relay, which releases at a value lower than a predetermined range of voltage, which lies between the two voltage ranges as mentioned above is provided.

The lower range of the two ranges is 0 to 0.5 v. and the higher voltage range is 1.2 to 1.8 v. Accordingly said voltage range may be selected to be 0.8 to 0.9 v. This relay may be constructed to release at a value, for instance, less than the range of 0.8 to 0.9 v. and to operate at a value higher than the above range. One end of circuit of this relay is connected to the cutting nozzle 1 and the other end of the relay circuit is connected to the workpiece 4. By this connection, the relay releases in the situations shown in FIGS. 1a, 1b or 1f and it operates in the situations shown in FIGS. 1c, 1d or 1e.

A contact of this relay circuit may be included in an electric circuit of a driving motor of the cutting device or may be included in an electric controlling circuit of a magnetic clutch for the driving shaft of the cutting device. By this arrangement automatic cutting device may be stopped when the relay releases and it operates when the relay operates.

According to the present invention it is possible to stop the automatic cutting device at the termination of cutting. Namely, at the situation of transition from the ordinary cutting condition shown in FIG. 1e to a condition shown in FIG. 1b and is possible to arrange the cutting device to be stopped in case of an emergency, namely, in a situation of transition from the condition shown in FIG. 1e to condition shown in FIG. 1f is happened. If the cutting device is made to standstill in a condition shown in FIG. 1f and if the cutting oxygen is stopped for several seconds, the workpiece 4 may be heated to be a melting temperature to cause the cutting oxygen to restart the cutting, at the same time the voltage difference increases and then the relay operates to restore the cutting operation automatically.

For this end a sequence controlling circuit (not shown) is combined with the relay circuit to stop the running operation of the device and the ejection of the cutting oxygen for a predetermined time when an emergency situation is happened, namely, a transition from a situation, shown in FIG. 1e to situation shown in FIG. 1f, is happened. By this arrangement the cutting operation may be safely restarted to attain the normal cutting condition shown in FIG. 1e without producing loss of the product.

It is also possible to stop the gas cutting operation at the termination of the gas cutting in synchronism with the stopping of the cutting device.

By combining such kind of the relay circuit with an electromagnetic valve circuit for the preheating flame and cutting oxygen, the above control may easily be effected. Thus the operations such as an automatic starting, an automatic stopping of the device, and an emergency stopping of the device and cutting may be controlled according to the situation of the actual cutting.

FIG. 2 shows an explanatory view of the automatic gas cutting device according to the present invention.

In FIG. 2, 1 is the cutting nozzle, 2 is a blowpipe, 3 is a holding arm of the blowpipe 2 and 4 is the workpiece, for instance, a steel plate. 6 is an insulating material for providing an electric insulation between the blowpipe 2 or the cutting nozzle 1 and the body 5 of the automatic cutting device. 8 is a relay provided in accordance with the present invention which operates over a voltage range, for instance, 0.8 to 0.9 v. and releases in a value lower than the range. This relay 8 may be inserted in an electric circuit in the power supply cord 7 extended from plug 10 to operate and to close the circuit by a switch arm 9. The cutting device generally indicated by 12 is moved on flame 11 in a known manner.

The cutting may be started from one end of the steel workpiece 4 while closing the switch arm 9 of the relay 8 by detecting the potential difference between the nozzle 1 and the workpiece 4. The automatic cutting device is controlled under the supervision of the relay 8 for opening and closing a conventional controlling circuit via the switch arm 9 and keeps the cutting operation to continue safely. This relay 8 may be released at the termination of the cutting operation or at an occurrence of the emergency condition during the cutting, and act to stop the action of cutting and stop the running of the device according to a predetermined schedule.

According to the present invention a great advantage in obtaining the cutting security is obtained. By applying the idea of the present invention an economizing of the manual watching during the cutting process is also obtained.

What we claim is:

1. An automatic cutting device comprising a detecting means for the induced voltage across a preheating flame of the gas cutting, and a controlling means which operates and releases under an instruction of the detecting means, said detecting means being arranged to respond to the voltage across the flame which is higher than a predetermined marginal voltage range so as to continue the operation and movement of the gas cutting device and to be insensitive to the voltage which is lower than the predetermined value so as to make the device to be a preparation stage.

2. An automatic gas cutting device according to claim 1, wherein the detecting means is constructed as a marginal relay means which operates by a voltage higher than a predetermined value and releases by a voltage lower than the predetermined value.

3. An automatic gas cutting device according to claim 1, wherein the range of the marginal voltage is choosen to be between a higher voltage range and a lower voltage range, of which the higher voltage range corresponding to situations of normal cutting operation such as, preheating stage, beginning stage and normal cutting stage, and the lower voltage range corresponding to situations such as before the preheating stage, test blowing stage and disabling stage of the cutting operation.

4. An automatic gas cutting device according to claim 1, wherein the running of the cutting device is stopped and the ejection of the cutting oxygen is temporarily stopped so as to restore the cutting operation when an emergency situation is detected during the progress of the cutting operation.

5. An automatic gas cutting device according to claim 1, wherein the higher voltage range lies in 1.2 to 1.8 volt and the lower voltage range lies in 0 to 0.5 volt.

6. An automatic gas cutting device according to claim 1, wherein the marginal voltage is selected to be in a range of 0.8 to 0.9 volt.